3,365,111
LAMINATED CONTAINER
John W. McNair, Jr., New York, N.Y., Walton B. Jones, Hatboro, Pa., Richard G. Columbo, Hopewell, Va., Harold B. Moors, Richboro, and James N. Ademino, Ambler, Pa., and Thomas R. Jackson and James B. Morris, Mobile, Ala., assignors to International Paper Company, New York, N.Y., a corporation of New York
Filed Mar. 21, 1966, Ser. No. 535,852
5 Claims. (Cl. 229—17)

ABSTRACT OF THE DISCLOSURE

A gable top container for bulk packaging of highly penetrating fluids such as soft drink syrups, having a multiple layer laminated paperboard construction to provide leakage resistance, flavor retention, and durability; an abhesive pattern positioned below the pouring lip to provide a sealing area between the pouring lip and the top of the abhesive pattern which prevents leakage through the gable top; as well as other features to provide a durable, leak resistant container made from paperboard base stock.

---

This invention relates to paperboard containers and in particular to paperboard containers for packaging in relatively large quantities highly penetrating fluids.

Paperboard containers are widely used for packaging foods and beverages, one of the best known paperboard containers being the so-called gable top container of the type shown in C. R. Alden Patent 2,750,095, issued June 12, 1956. Such containers are typically assembled from a paperboard blank which has been coated on both sides with single layer of protective thermoplastic material such as wax or polyethylene. These containers generally find application in packaging perishable foods for relatively short periods of time, and therefore the most common container sizes are those which have capacities up to and including one gallon.

Since substantial economy and convenience can be effected by using paperboard containers instead of glass or metal containers, it is desirable to extend the application of paperboard containers to replace glass or metal containers wherever feasible. One such application is the packaging of soft drink syrups which are generally supplied in bulk quantities to soda fountains, restaurants and other places of public accommodation. However, the packaging of these syrups presents a number of problems not encountered in packaging other food products, and it has been found that the ordinary paperboard container used for example in packaging milk is unsatisfactory for packaging soft drink syrups.

The problems raised by the packaging of soft drink syrups may be divided into two broad categories: container durability and product quality. Under container durability, the chief problem is the extraordinary ability of soft drink syrups, particularly the so-called low-calorie varieties, to penetrate or "wick" rapidly into the paperboard base stock through exposed edges and through defects and imperfections in the coating material, thereby weakening the container and ultimately causing it to leak or rupture. This problem is aggravated by the relatively large container sizes required for reasons of economy to package these syrups, since half gallon and gallon paperboard containers filled with relatively heavy fluids are much more susceptible to damage from handling vibration and abuse than smaller containers, due to greater flexure of the various parts of the large container. In the case of soft drink syrups, any damage to the coating material on the inside surface of the container results in immediate and disastrous penetration of the paperboard base stock by the syrup. Further aggravation of this problem is caused by the requirement of a relatively long shelf life, since exposure of even small areas of the paperboard base stock, such as may occur through tiny pinholes in the plastic coating, will over a long period of time permit the syrup to penetrate and weaken large portions of the paperboard base stock.

In addition to lacking sufficient durability, the conventional paperboard carton does not provide adequate protection for the quality of packaged syrup. This loss of quality is believed to be attributable primarily to the inadequacy of the single layer of thermoplastic coating as a barrier to prevent both loss of aromatic oils and other ingredients vital to the flavor of the packaged syrup, and penetration of the syrup by unwanted foreign substances such as oxidizing agents and gases.

In this invention there is provided a paperboard container which affords substantially the same advantages as conventional paperboard containers, such as economy, convenience, and adaptability to large scale production techniques, but which also provides a durable, large capacity package that is resistant both to penetration of the paperboard by the packaged fluid and to penetration of the fluid by unwanted foreign substances. The container of this invention is constructed from a multiple layer laminated paperboard in which there are multiple protective layers between the paperboard base stock and the packaged fluid, and in which at least one of the layers between the paperboard base stock and the packaged fluid is a metal or metallic substance, thereby improving the durability of a container assembled from the laminated paperboard as well as serving as an effective barrier to unwanted fluid penetration of the paperboard base stock and unwanted loss or deterioration of ingredients of the packaged fluid. Resistance to fluid penetration of the paperboard base stock is further enhanced by assembling the carton so that the side seam or fifth panel is placed on the outside rather than the inside of the carton, as a result of the discovery that this panel on the inside corner of the container was a weak point which was subject to delamination and consequent fluid penetration. In addition, resistance to leakage and fluid penetration of the paperboard base stock through exposed interior edges of the container is improved by protecting or covering the exposed edges. Better leakage resistance is also provided by changing the usual positions of the abhesive patterns on the pouring spout portion of the container so that a better seal is obtained.

Durability is significantly aided not only by the multiple layer laminated construction but also by covering a selected portion of the interior of the bottom of the container with a protective film. Also, a number of parallel shock absorbing score lines are impressed on the exterior corners of the container at nonzero angles with the horizontal to increase the ability of the container to withstand stresses due to sudden impacts from dropping the container.

These and other features of the present invention will be fully understood from the following detailed description of illustrative embodiments thereof taken in connection with the appended drawings, in which:

FIG. 8A, which appears on the sheet of drawings including FIGS. 5A, 5B, and 6, shows a side seam panel of the multiple layer laminated paperboard of this invention in which the edge of the panel has been skived in accordance with this invention; and FIG. 8B, which also appears on the sheet of drawings including FIGS. 5A, 5B, and 6, shows the skived panel illustrated in FIG. 8A after it has been bonded to another panel.

Figure 1:
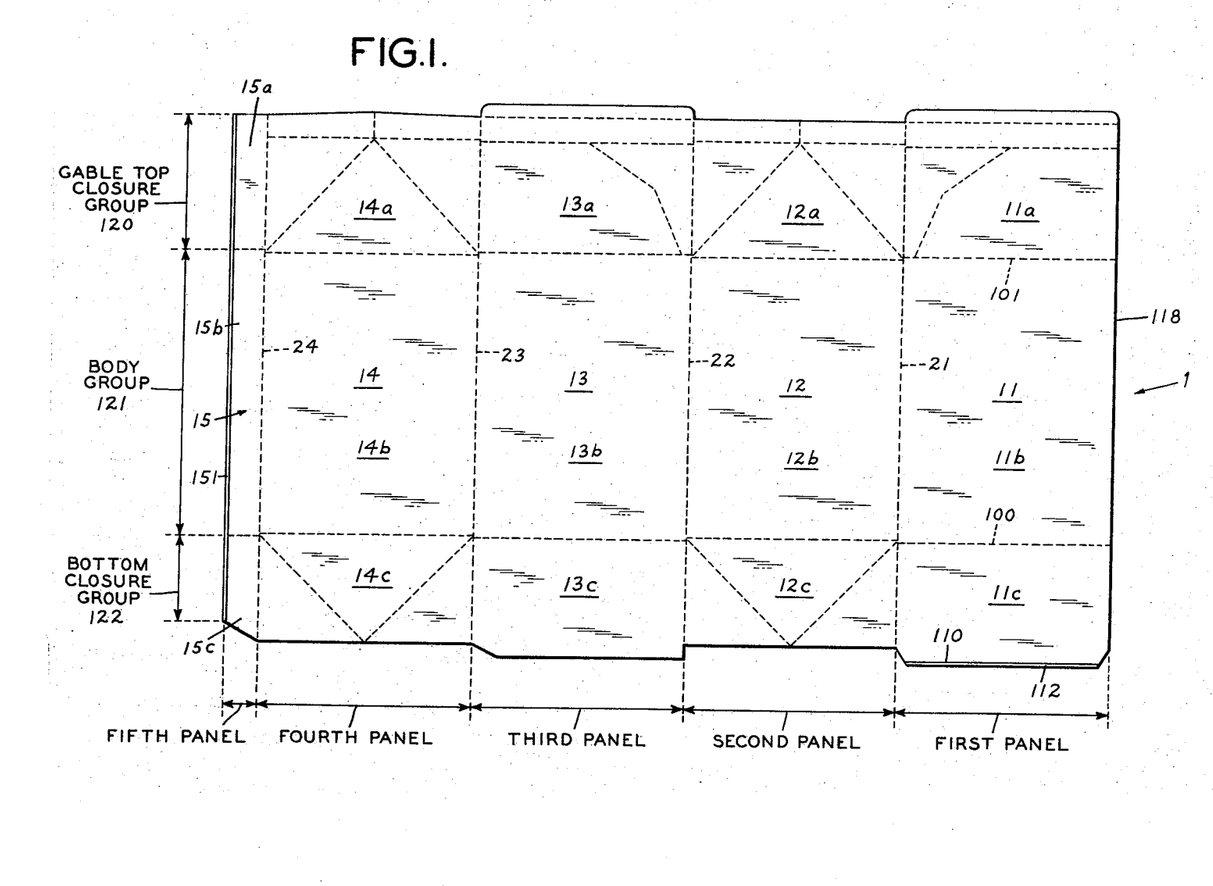
FIG. 1 is a layout view of one surface of a container blank provided with protective covering for selected edges of the blank.

Referring now to the drawings wherein like reference characters designate like parts throughout the several views, there is shown in FIG. 1 a flat blank 1 from which the carton of this invention is constructed. The blank 1 is divided by score lines 21, 22, 23, 24 into four side wall panels 11, 12, 13, and 14, and a side seam panel 15, each panel being divided by score lines 101 and 100 into three sections, a top section, a body section, and a bottom section. The top sections 11a, 12a, 13a, 14a, 15a of the panels collectively constitute the gable top closure group 120 from which the gable top of the completed container is formed, the body sections 11b, 12b, 13b, 14b, 15b of the panels collectively constitute the body group 121 from which the vertical side walls of the completed container are formed, and the bottom sections 11c, 12c, 13c, 14c, 15c of the panels collectively constitute the bottom closure group 122 from which the bottom of the completed container is formed.

Figure 8A:
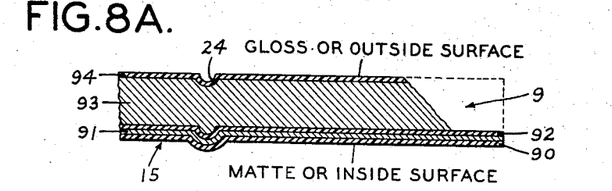

In order to serve as a large capacity container for fluids such as soft drink syrups, it is necessary that the container be both substantially more durable than the ordinary paperboard containers used for packaging such fluids as milk, and substantially impervious to the entry and exit of gases and fluids which may adversely affect the flavor, quality and edibility of the packaged fluid. It has been found that by forming the blank 1 from a multiple layer laminated paperboard in which at least one layer is a metal or metallic substance, a substantially more durable and more impervious container is obtained. A cross section of a suitable laminated paperboard is shown in FIG. 8A, in which one side of the paperboard base stock 93 is covered by a layer of plastic 94 which may be selected from any one of a number of well known thermoplastic resins, and the other side of the paperboard base stock 93 is covered by a layer of a metallic substance 91 interposed in bonded relationship between layers of plastic 90 and 92. The thickness and composition of each of the various layers may be selected according to the characteristics of the product to be packaged, and the capabilities of the equipment required to manufacture the laminated paperboard, form the blanks, and fold and seal the blanks to assemble the finished carton. An example of the composition of the various layers of a suitable laminated paperboard stock, calculated on a 3000 square foot basis, is as follows:

| | |
|---|---|
| Outside of laminated paperboard | ---- |
| Polyethylene | pounds 9.0 |
| Paperboard | do 335.0 |
| Polyethylene | do 10.0 |
| Aluminum foil (0.00035 inch) | do 14.0 |
| Polyethylene | do 20.0 |
| Inside of laminated paperboard | ---- |

Figure 2A:
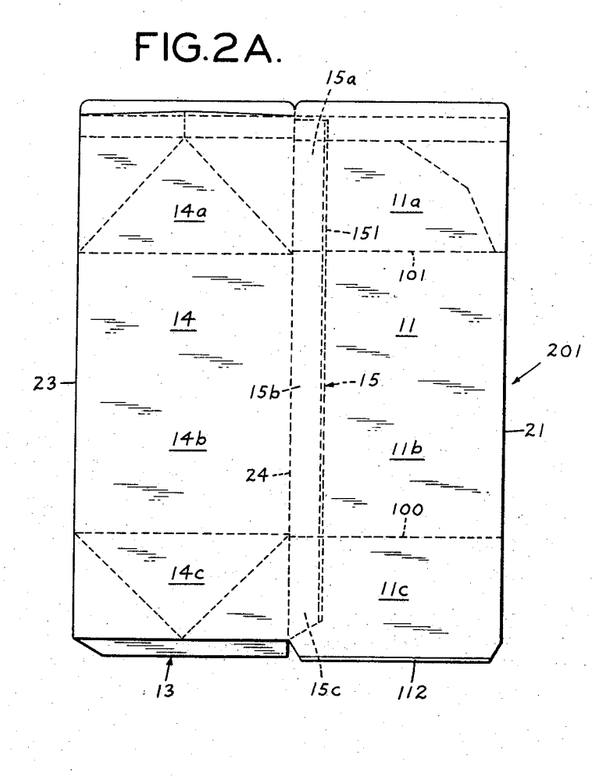
FIG. 2A is a flat side seamed blank made from the blank shown in FIG. 1, showing the outside surface thereof with the side seam panel folded inside the side seamed blank.
Figure 2B:
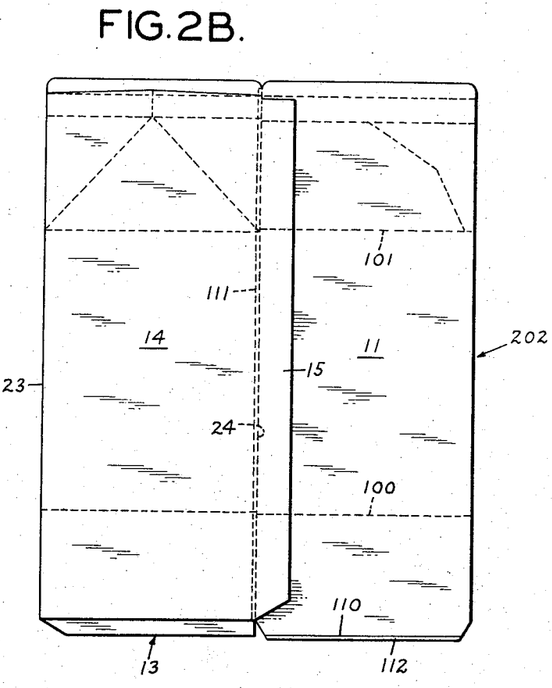
FIG. 2B is a flat side seamed blank made from the blank shown in FIG. 1, showing the outside surface thereof with the side seam panel folded outside the side seamed blank.

In order to form the finished carton from the blank 1 shown in FIG. 1, the blank 1 is side seamed in the manner shown in either FIG. 2A or FIG. 2B. In FIG. 2A the blank 1 of FIG. 1 is side seamed to form a semi-finished blank 201 by having fourth panel 14 and side seam flap or fifth panel 15 folded about score line 23, and by having first panel 11 folded about score line 21 until the inside surface of first panel 11 contacts the outside surface of side seam flap or fifth panel 15. The area of first panel 11 contacting fifth panel 15, as well as the contacted area of fifth panel 15, is heated to activate its outer coating for heat sealing first panel 11 to fifth panel 15, so that the outside surface of fifth panel 15 is bonded to the inside surface of first panel 11. By this folding and sealing arrangement, fifth panel 15 is placed inside the finished carton assembled from semi-finished blank 201, which is the usual position for fifth panel 15 in conventionally assembled cartons. However, in various experiments with one gallon capacity containers, it has been observed that the weakest point in the bottom of the completely assembled carton is the corner containing the fifth panel folded in the usual position inside the carton as shown in FIG. 2A. As a result of this weakness, stresses during handling and abuse of a carton with its fifth panel folded inside the carton cause delamination of the inner polyethylene and aluminum layers of the fifth panel, thereby permitting the packaged fluid to penetrate into the paperboard base stock and produce failure of the carton.

It has been discovered that the above-described weakness in the bottom corner of conventionally assembled cartons may be eliminated by side seaming blank 1 of FIG. 1 in the manner shown in FIG. 2B, in which the inside surface of fifth panel 15 is bonded to the outside surface of first panel 11. By this arrangement, fifth panel 15 is placed outside the semi-finished blank 202 so that stresses on fifth panel 15 which occur during handling of the carton do not result in penetration by the packaged fluid into fifth panel 15 and ultimate failure of the carton. Perspective top and bottom views of a carton 302 assembled from a semi-finished blank with an outside fifth panel as shown in FIG. 2B are provided by FIGS. 3A and 3B.

Figures 3A, 3B, 4C, 4D:
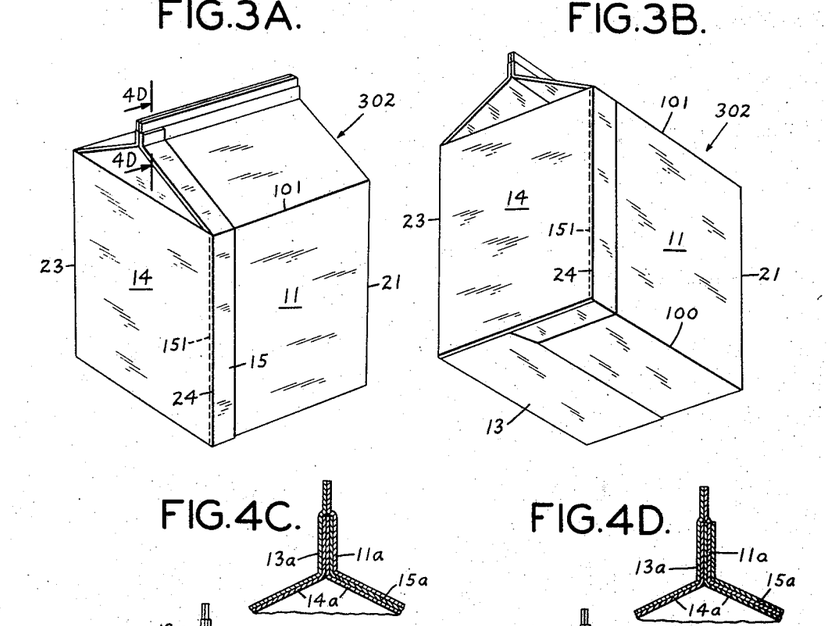
FIG. 3A is a top perspective view of the assembled container constructed from the blank shown in FIG. 2B.
FIG. 3B is a bottom perspective view of the assembled container constructed from the blank shown in FIG. 2B.
FIG. 4C is a sectional view of the gable top closure portion of the assembled container shown in FIG. 4A.
FIG. 4D is a sectional view of the gable top closure portion of the assembled container shown in FIGS. 3A and 4B, taken along line 4D in FIG. 3A.

Placing fifth panel 15 outside the carton rather than inside also improves the ability of the carton to resist leaks in the gable top closure. This may be observed from a comparison of the conventional gable top closure mechanism shown in FIGS. 4A and 4C with the gable top closure mechanism of this invention shown in FIGS. 4B and 4D. It is observed in FIGS. 4A and 4C that with fifth panel 15 inside the carton, there is wedged between the bonded gable top closure portions 11a and 13a of carton 401 both the top closure portion 15a of fifth panel 15 and the doubled over top closure portion 14a of fourth panel 14. On the other hand, as shown in FIGS. 4B and 4D, with fifth panel 15 outside carton 302, there is wedged between the top closure segments 11a and 13a only the doubled over top closure portion 14a, thereby permitting a better seal between elements 11a and 13a than can be obtained with fifth panel 15 positioned inside the carton.

Figure 4A:
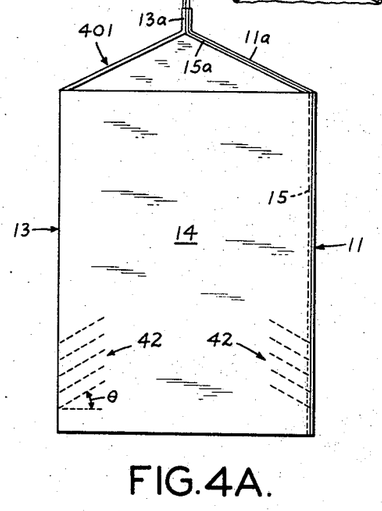
FIG. 4A is a side elevation view of an assembled container with an inside side seam panel, illustrating one arrangement of shock absorbing score lines at the exterior corners of the container.
Figure 4B:
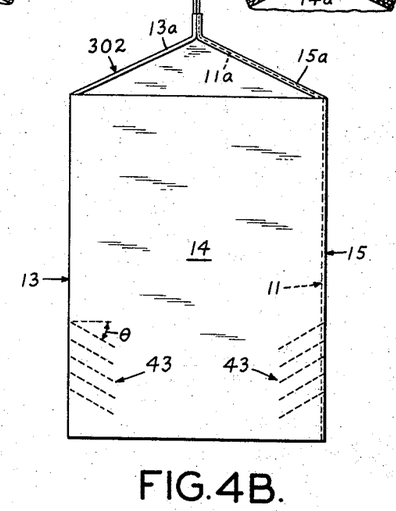
FIG. 4B is a side elevation view of an assembled carton with an outside side seam panel illustrating another arrangement of shock absorbing score lines at the exterior corners of the container.

FIGS. 4A and 4B also illustrate groups of parallel shock absorber score lines 42 and 43, respectively, which are impressed on the outside surface at each corner of the carton to improve its durability under conditions of sudden shock such as may occur when a filled carton is dropped upon a hard surface. These score lines are preferably impressed at an angle $\theta > 0°$ with the horizontal, where $\theta$ may be on the order of 30° and may be either above the horizontal as shown in FIG. 4A or below the horizontal as shown in FIG. 4B.

Figure 7A:
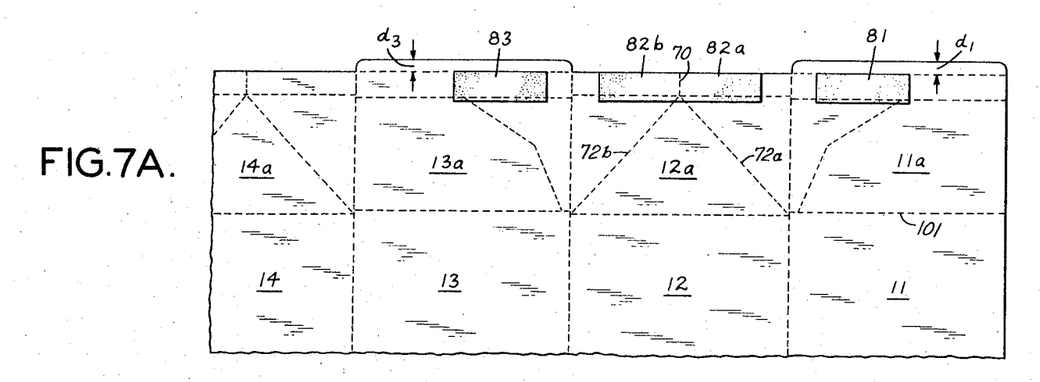
FIG. 7A is a partial layout view of a container blank having adhesive patterns applied in their usual positions.
Figure 7B:
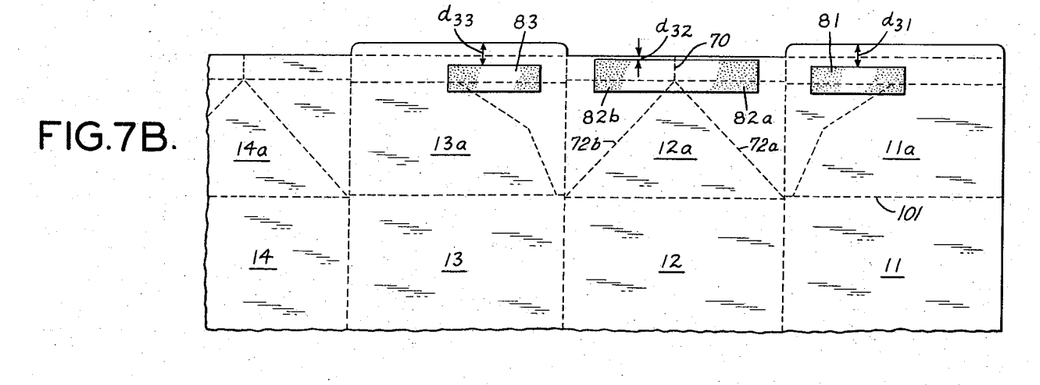
FIG. 7B is a partial layout view of a container blank having abhesive patterns applied in accordance with this invention.

Another feature for improving the seal at the gable top closure is illustrated by FIGS. 7A and 7B. In FIG. 7A there is shown the usual positions for abhesive patterns 81, 82a, 82b, 83 on the inside surfaces of panel segments 11a, 12a, and 13a which form the pouring spout of the assembled carton, the top edge of panel segment 12a being folded outwardly on either side of score line 70 to form the lips of the pouring spout when the sealed gable top is opened. These abhesive patterns, as described in the copending application of D. K. Huang and H. B. Moors, Ser. No. 107,348, filed May 3, 1961, now United States Patent 3,292,842, issued Dec. 20, 1966, permit the use of usual heat sealing techniques and apparatus to seal the top of the container while allowing the sealed panel segments 11a, 12a, 13a, when subsequently opened, to form a pouring spout without any tearing on the inside top edges of panel segment 12a which form the pouring spout lips, and without excessive tearing of the panel segments 11a and 13a except along their topmost edges.

It has been found, however, that the seal obtained with the abhesive pattern shown in FIG. 7A is not sufficiently leak resistant for soft drink syrups, especially under severe handling conditions. Investigation has revealed that the abhesive patterns 81 and 83, which are conventionally spaced at respective distances $d_1$ and $d_3$ below the top edges of panel segments 11a and 13a, together with the abhesive patterns 82a and 82b which extend to the very top edge of panel segment 12a, do not leave sufficient sealing areas above the abhesive patterns 81 and 83 to prevent leakage of fluids having the high degree of penetrability characteristic of soft drink syrups, particularly under abusive handling conditions.

FIG. 7B illustrates the preferred locations of abhesive patterns 81, 82a, 82b, and 83 on panel segments 11a, 12a, and 13a of the carton of this invention, in order to provide leak resistant packaging for fluids with a high degree of penetrability. It is observed that abhesive patterns 81 and 83 are respectively spaced distances $d_{31}$ and $d_{33}$ below the top edges of panel segments 11a and 13a, where $d_{31}$ is larger than $d_1$ in FIG. 7A and $d_{33}$ is larger than $d_3$ in FIG. 7A. For example, if $d_1 = d_3 = \frac{3}{16}''$, then $d_{31} = d_{33}$ may be on the order of $\frac{7}{16}''$, that is, patterns 81 and 83 are spaced below the top edges of panels 11a and 13a about twice the distance customary for conventional cartons. Further, abhesive patterns 82a and 82b on panel segment 12a are spaced below the top edge of panel segment 12a by a distance $d_{32}$. This arrangement provides an assembled carton in which panel segment 12a is folded about score lines 70, 72a, 72b, and panel segments 11a and 13 are folded about score line 101, all toward the interior of the carton, so that the contacts between abhesive patterns 82b and 83 and between abhesive patterns 82a and 81 allow not only greater sealing areas between the top edges of panel segments 11a and 13a but also sealing areas between the inside top edges of panel segments 12a and 11a on one hand and 12a and 13a on the other. The top edge of panel segment 12a folded outwardly on either side of score line 70 forms the pouring lip of the spout when the assembled gable top is opened.

Because of the high degree of penetrability of fluids such as soft drink syrups, it has been found that the packaged fluid is able to penetrate rapidly through large areas of the paperboard layer of the laminated stock via any interior panel edge which exposes the inner paperboard layer to the fluid. To prevent this penetration and the consequent weakening, discoloration, and ultimate failure of the carton, as well as to prevent deterioration of the quality of the packaged fluid because of loss of aromatic flavorings and oxidation, a number of features have been incorporated in the carton of this invention to prevent contact between the raw or exposed paperboard edges of the panels and the packaged fluid. One such feature is shown in FIGS. 1, 2A and 2B, in which the raw edges of panels to be folded inside the assembled carton are first coated with a bead of fluid and gas resistant material, which may be for example, any well-known hot melt comprising an appropriate combination of various resins, waxes and modifying agents such as plasticizers and antioxidants. An example of a suitable hot melt material is that manufactured by Morningstar-Paisley Co. under the designation G6263. Thus in FIG. 1 and FIG. 2A, where fifth panel 15 is shown folded inside the semi-finished carton blank 201, a bead 151 is provided along the edge of panel 15. Similarly, since the folding of the bottom segment of first panel 11 along score line 100 places the bottom edge of first panel 11 inside the carton, the bottom edge of panel 11 is also coated by protective bead 112, which may be of the same material as bead 151. Of course, when fifth panel 15 is placed outside the carton, then it is the side edge 118 of panel 11 which is placed inside the carton, thereby requiring a protective bead 111 as shown in FIG. 2B.

Figure 6:
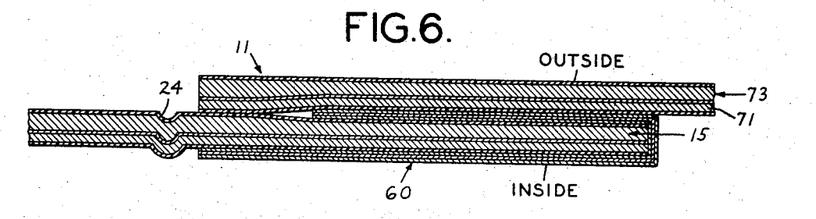
FIG. 6 is a sectional view of a side seam panel of the laminated paperboard of this invention, in which the side seam panel is bonded to a first side wall panel and in which the edge of the side seam panel is covered by a laminated tape.

An alternative arrangement is shown in FIG. 6, in which an interior panel edge may be protected by a tape 60 covering that edge of the panel which is exposed to the packaged fluid. A suitable composition for tape 60 is a laminated polyethylene-cellophane-polyethylene construction, and the tape may be applied by conventional heat sealing techniques. Although FIG. 6 shows tape 60 applied to fifth panel 15, thereby indicating that fifth panel 15 is to be on the inside of the assembled carton, it is to be understood that tape 60 may be applied instead to first panel 11 for the situation in which first panel 11 rather than fifth panel 15 is to be on the outside of the assembled carton.

Figure 8B:
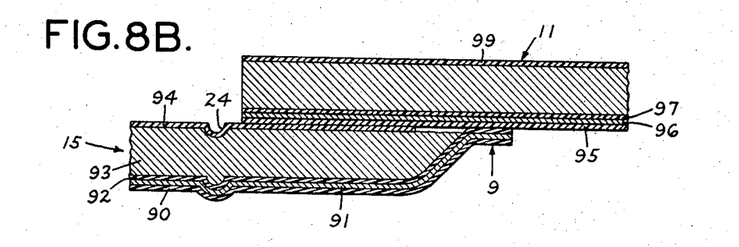

Another solution to the problem of protecting an interior panel edge exposed to packaged fluid is illustrated in FIGS. 8A and 8B, this solution being designed for the situation in which fifth panel 15 is to be inside the assembled carton. As shown in FIG. 8A, the gloss or outside polyethylene layer 94 and the paperboard layer 93 are skived away at the edge of fifth panel 15, leaving a short flap 9 of the matte side polyethylene, aluminum foil, and polyethylene layers 92, 91, and 90. Fifth panel 15 is then side seamed to first panel 11 by any conventional heat sealing technique, and as shown in FIG. 8B, the heat and pressure of the sealing process cause flap 9 both to fold over the exposed paperboard edge of fifth panel 15 and to seal to first panel 11.

Figure 5A:
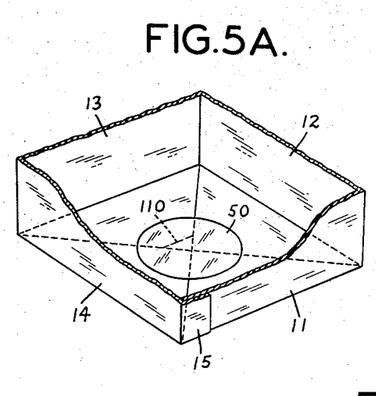
FIGS. 5A and 5B are partial perspective views of the interior of the bottom of the assembled container shown in FIG. 3A, respectively illustrating a plastic film covering a selected portion of the bottom and the entire bottom.
Figure 5B:
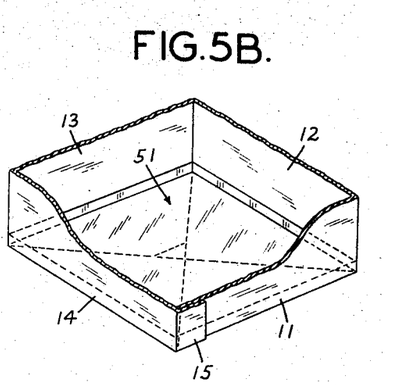

A further arrangement for protecting the exposed portion of the bottom edge 110 of first panel 11 is shown in FIG. 5A, in which a film 50 of a suitable protective material such as the hot melt described above is deposited in the center of the bottom interior of the assembled carton, thereby to cover the exposed portion of edge 110 before the carton is filled with the intended fluid. It has also been found that the durability of the bottom of the container is substantially improved by coating the entire bottom interior of the assembled carton instead of just the center portion of the bottom interior, including the edges and corners, with a film 51 of suitable protective material in the fashion shown in FIG. 5B.

It is to be understood, of course, that with automatic machinery it may be more convenient to apply any one of the above protective measures to all of the edges of blank 1 rather than to selected edges. In this situation, it may be desirable to immerse all of the edges of blank 1 into a solution containing a suitable protective material such as a chromium salt solution of the type sold under the mark Quillon-C. A suitable solution has been found to be 5% Quillon-C, and 95% solvent composed of 90% water and 10% isopropyl alcohol, and after the edges of the blank have been immersed in this solution, the blank is heated to drive off the solvent and thereby form a fluid resistant barrier at the edges of the blank.

While the invention has been described in connection with specific embodiments thereof and in specific uses, various modifications thereof will occur to those skilled in the art without departing from the spirit and scope of the invention as set forth in the appended claims.

What is claimed is:

1. The method of sealing a container formed from a blank of foldable sheet material of multiple layer laminated paperboard including an outside layer of plastic having an inside surface and an outside surface, a paperboard layer having two surfaces, a first inside layer of plastic having two surfaces, a layer of metal, and a second inside layer of plastic having two surfaces, wherein the inside surface of said outside layer of plastic is bonded to one surface of said paperboard layer, one surface of said first inside layer of plastic is bonded to the other surface of said paperboard layer, and said layer of metal is interposed in bonded relationship between the other surface of said first inside layer of plastic and one surface of the second inside layer of plastic so that the unbonded outside surface of said outside layer of plastic forms the outside surface of said blank and the other surface of said second inside layer of plastic forms the inside surface of said blank, and a plurality of score lines dividing said foldable sheet material into five contiguous panels including first, second, third, and fourth side wall panels and a side seam panel, which consists of the steps of removing said outside layer of plastic and said paperboard layer from the edge of said side seam panel thereby to leave a relatively short flap comprising said layer of metal interposed in bonded relationship between the other surface of said first inside layer of plastic and one surface of the second inside layer of plastic so that said one surface of said first inside layer of plastic forms the outside surface of said flap, and applying heat and pressure to seal said outside surface of said flap to said inside surface of said first side wall panel.

2. The method of treating a selected panel of a container formed from a blank of foldable sheet material of multiple layer laminated paperboard including an outside layer of plastic having an inside surface and an outside surface, a paperboard layer having two surfaces, a first inside layer of plastic having two surfaces, a layer of metal, and a second inside layer of plastic having two surfaces, wherein the inside surface of said outside layer of plastic is bonded to one surface of said paperboard layer, one surface of said first inside layer of plastic is bonded to the other surface of said paperboard layer, and said layer of metal is interposed in bonded relationship between the other surface of said first inside layer of plastic and one surface of the second inside layer of plastic so that the unbonded outside surface of said outside layer of plastic forms the outside surface of said blank and the other surface of said second inside layer of plastic forms the inside surface of said blank, and a plurality of score lines dividing said foldable sheet material into five contiguous panels including first, second, third, and fourth side wall panels and a side seam panel, which consists of the step of removing said outside layer of plastic and said paperboard layer from the edge of a selected one of said panels to leave a relatively short flap comprising said layer of metal interposed in bonded relationship between the other surface of said first inside layer of plastic and one surface of the second inside layer of plastic so that said one surface of said first inside layer of plastic forms the outside surface of said flap.

3. A gable top container for bulk packaging of fluids, wherein said container is assembled from an integral blank of foldable sheet material divided by a first group of score lines into five contiguous panels including first, second, third, and fourth side wall panels and a side seam panel, in which each of said panels is divided by a second group of score lines into gable top, body and bottom sections, and in which said gable top section is sub-divided by a third group of score lines into sections defining a pouring spout, said blank comprising a multiple layer laminated paperboard including an outside layer of plastic having an outside surface and an inside surface, a paperboard layer having two surfaces, a first inside layer of plastic having first and second surfaces, a layer of metal, and a second inside layer of plastic having two surfaces, wherein the inside surface of said outside layer of plastic is bonded to one surface of said paperboard layer, said first surface of said first inside layer of plastic is bonded to the other surface of said paperboard layer, and said layer of metal is interposed in bonded relationship between the second surface of said first inside layer of plastic and one surface of said second inside layer of plastic, so that the outside surface of said outside layer of plastic forms the outside surface of said blank and the other surface of said second inside layer of plastic forms the inside surface of said blank, and an abhesive coating covering a selected area of the inside surface of the top section of each of said first, second, and third side wall panels, each selected area being spaced a predetermined distance below the top edge of the corresponding top section, the top edge of said abhesive coating on said *first and third side wall panels* being below the top edge of said abhesive coating on said second side wall panel to leave sealing areas of predetermined sizes on the top sections of each of said first, second, and third side wall panels, each sealing area being located between the top of each said abhesive coating area and the corresponding top edge of each said top section, wherein said container assembled from said blank has a gable top closure with a pouring spout in which said top section of said second side wall panel is folded inwardly about said third group of score lines toward the interior of said container so that one half of the sealing area on the inside surface of said top section of said second side wall panel is bonded to the sealing area on the inside surface of said top section of said first side wall panel, and so that the other half of said sealing area on the inside surface of said top section of said second side wall panel is bonded to said sealing area on the inside surface of said top section of said third side wall panel, and wherein said top edge of said inwardly folded top section of said second wall panel forms the pouring edge of said spout, after said gable top closure is opened.

4. A gable top container for bulk packaging of fluids, wherein said container is assembled from an integral blank of foldable sheet material divided by a first group of score lines into five contiguous panels including first, second, third, and fourth side wall panels and a skived side seam panel, in which each of said panels is divided by a second group of score lines into gable top, body and bottom sections, and in which said gable top section is sub-divided by a third group of score lines into sections defining a pouring spout, said blank comprising
   a multiple layer laminated paperboard including
     an outside layer of plastic having an outside surface and an inside surface,
     a paperboard layer having two surfaces,
     a first inside layer of plastic having first and second surfaces,
     a layer of metal, and
     a second inside layer of plastic having two surfaces,
     wherein the inside surface of said outside layer of plastic is bonded to one surface of said paperboard layer, said first surface of said first inside layer of plastic is bonded to the other surface of said paperboard layer, and said layer of metal is interposed in bonded relationship between the second surface of said first inside layer of plastic and one surface of said second inside layer of plastic, so that the outside surface of said outside layer of plastic forms the outside surface of said blank and the other surface of said second inside layer of plastic forms the inside surface of said blank, and
   an abhesive coating covering a selected area of the inside surface of the top section of each of said first, second, and third side wall panels, each said selected area being spaced a predetermined distance below the top edge of the corresponding top section, the top edge of said abhesive coating on said *first and third side* wall panels being below the top edge of said abhesive coating on said second side wall panel to leave sealing areas of predetermined sizes on the top sections of said first, second, and third side wall panels, each sealing area being located between the top of each said abhesive coating area and the corresponding top edge of each said top section,
   wherein the container assembled from said blank has a gable top closure with a pouring spout in which said top section of said second side wall panel is folded inwardly about said third group of score lines toward the interior of said container so that one half of the sealing area on the inside surface of said top section of said second side wall panel is bonded to the sealing area on the inside surface of said top section of said first side wall panel, and so that the other half of said sealing area on the inside surface of said top section of said second side wall panel is bonded to said sealing area on the inside surface of said top section of said third side wall panel, and
   wherein said top edge of said inwardly folded top section of said second wall panel forms the pouring edge of said spout, and
   said skived side seam panel comprising a skived edge parallel to said first group of score lines which comprises a flap of laminated material extending beyond the remaining unskived portion of said side seam panel, said flap comprising said first inside layer of plastic, said layer of metal, and said second inside layer of plastic,
   wherein said container assembled from said blank has said side seam panel bonded to the inside surface of said first side wall panel by bonding said outside surface of the remaining portion of said outside layer of plastic on said side seam panel and the first surface of said inside layer of plastic on said flap of laminated material to the inside surface of said second inside layer of plastic on said first side wall panel.

5. A gable top container for bulk packaging of fluids, wherein said container is assembled from an integral side seamed blank of foldable sheet material divided by a first group of score lines into five contiguous panels including first, second, third, and fourth side wall panels and a side seam panel, in which each of said panels is divided by a second group of score lines into gable top, body and bottom sections, and in which said gable top section is sub-divided by a third group of score lines into sections defining a pouring spout, said side seamed blank comprising
   a multiple layer laminated paperboard including
     an outside layer of plastic having an outside surface and an inside surface,
     a paperboard layer having two surfaces,
     a first inside layer of plastic having first and second surfaces,
     a layer of metal, and
     a second inside layer of plastic having two surfaces,
     wherein the inside surface of said outside layer of plastic is bonded to one surface of said paperboard layer, said first surface of said first inside layer of plastic is bonded to the other surface of said paperboard layer, and said layer of metal is interposed in bonded relationship between the second surface of said first inside layer of plastic and one surface of said second inside layer of plastic, so that the outside surface of said outside layer of plastic forms the outside surface of said side seamed blank and the other surface of said second inside layer of plastic forms the inside surface of said side seamed blank,
   an abhesive coating covering a selected area of the inside surface of the top section of each of said first, second, and third side wall panels, each said selected area being spaced a predetermined distance below the top edge of the corresponding top section, the top edge of said abhesive coating on said *first and third side* wall panels being below the top edge of said abhesive coating on said second side wall panel to leaving sealing areas of predetermined sizes on the top sections of each of said first, second, and third side wall panels, each sealing area being located between the top of each said abhesive coating area and the corresponding top edge of each said top section,
   wherein said container assembled from said blank has a gable top closure with a pouring spout in which said top section of said second side wall panel is folded inwardly about said third group of score lines toward the interior of said container so that one half of the sealing area on the inside surface of said top section of said second side wall panel is bonded to the sealing area on the inside surface of said top section of said first side wall panel, and so that the other half of said sealing area on the inside surface of said top section of said second side wall panel is bonded to said sealing area on the inside surface of said top section of said third side wall panel, and
   wherein said top edge of said inwardly folded top section of said second wall panel forms the pouring edge of said spout, and
   a sealing bond between the inside surface of said side seam panel and the outside surface of said first side wall panel.

References Cited
UNITED STATES PATENTS

| | | | |
|---|---|---|---|
| 1,920,533 | 8/1933 | Strauss. | |
| 2,506,056 | 5/1950 | Bergstein | 229—3.5 |
| 2,543,757 | 3/1951 | Bergstein. | |
| 2,550,520 | 4/1951 | Bennett | 229—48 |
| 2,682,987 | 7/1954 | Spiess | 229—14 |
| 2,996,233 | 8/1961 | Craig et al. | 229—17 |
| 3,232,516 | 2/1966 | Arslanian | 229—37 |
| 3,239,126 | 3/1966 | Arslanian | 229—3.5 |
| 3,244,353 | 4/1966 | Miessler | 229—39 |
| 3,270,940 | 9/1966 | Egleston et al. | 229—17 |

DAVID M. BOCKENEK, *Primary Examiner.*

UNITED STATES PATENT OFFICE
CERTIFICATE OF CORRECTION

Patent No. 3,365,111                      January 23, 1968

John W. McNair, Jr., et al.

It is certified that error appears in the above identified patent and that said Letters Patent are hereby corrected as shown below:

Column 3, line 29, "adhesive" should read -- abhesive --.
Column 10, line 35, "leaving" should read -- leave --.

Signed and sealed this 11th day of November 1969.

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,365,111 January 23, 1968

John W. McNair, Jr., et al.

It is certified that error appears in the above identified patent and that said Letters Patent are hereby corrected as shown below:

Column 3, line 29, "adhesive" should read -- abhesive --. Column 8, line 43, column 9, lines 29 and 30, and column 10, lines 32 and 33, "first and third side", each occurrence, should not be italicized. Column 10, line 35, "leaving" should read -- leave --.

This certificate supercedes the Certificate of Correction issued November 11, 1969.

Signed and sealed this 24th day of February 1970.

(SEAL)
Attest:

Edward M. Fletcher, Jr.             WILLIAM E. SCHUYLER, JR.
Attesting Officer                  Commissioner of Patents